United States Patent [19]

Chrysler et al.

[11] 4,261,612
[45] Apr. 14, 1981

[54] WINDOW STRUCTURE FOR VEHICLES

[75] Inventors: Richard R. Chrysler, Brighton; David L. Draper, Lathrup Village, both of Mich.

[73] Assignee: Cars & Concepts, Inc., Brighton, Mich.

[21] Appl. No.: 27,671

[22] Filed: Apr. 6, 1979

[51] Int. Cl.³ ............................................... B60J 1/00
[52] U.S. Cl. .................................. 296/146; 296/37.16
[58] Field of Search ................... 296/146, 37.8, 76, 89, 296/137 B, 201, 200, 37.16, 52, 56, 148, 147

[56] References Cited

U.S. PATENT DOCUMENTS

| | | | |
|---|---|---|---|
| 3,181,911 | 5/1965 | Peras | 296/56 X |
| 3,240,527 | 3/1966 | Weiss et al. | 296/37.8 X |
| 3,713,472 | 1/1973 | Dozois | 296/56 X |
| 3,716,945 | 2/1973 | Cooper | 296/56 X |
| 3,781,059 | 12/1973 | Davis | 296/137 B |
| 3,820,839 | 6/1974 | Molatalab | 296/137 B X |
| 3,909,060 | 7/1975 | Katayama | 296/76 X |
| 4,161,336 | 7/1979 | LeVan et al. | 296/137 B |

*Primary Examiner*—John J. Love
*Assistant Examiner*—Norman L. Stack
*Attorney, Agent, or Firm*—Fisher, Gerhardt, Crampton & Groh

[57] ABSTRACT

A window structure for vehicle bodies in which the rear window is hinged and is held in a closed position by a latch arrangement which is accessible only from the interior of the vehicle. The opening of the rear window is provided with a seal which biases the window light towards its open position so that the window can be grasped and moved to a selected fully opened position.

5 Claims, 9 Drawing Figures

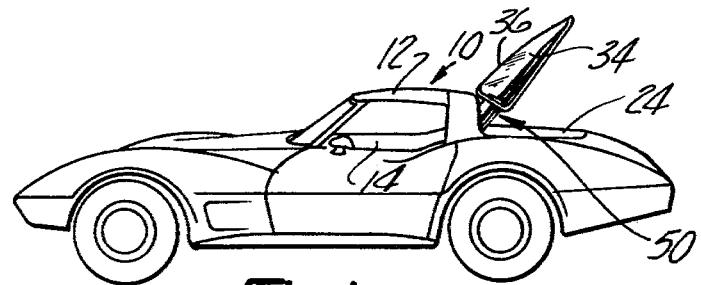
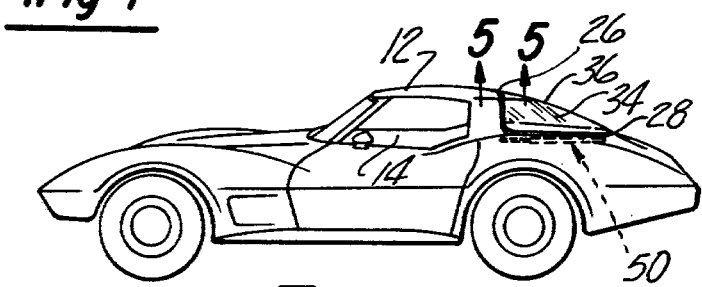
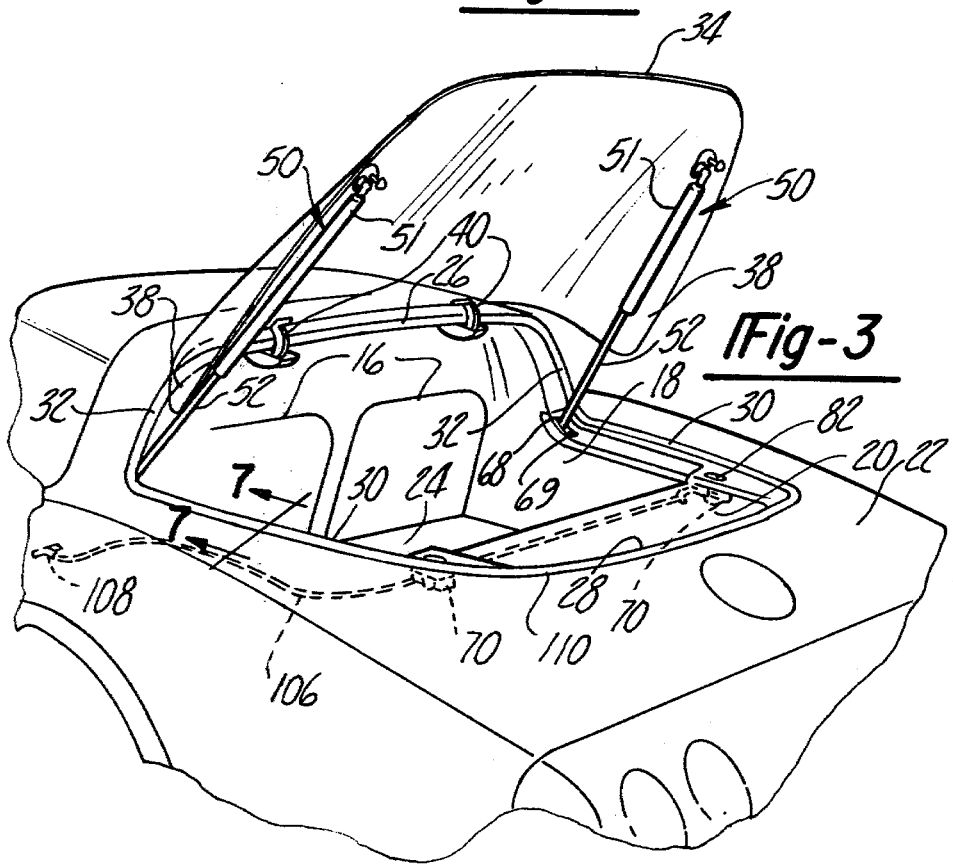

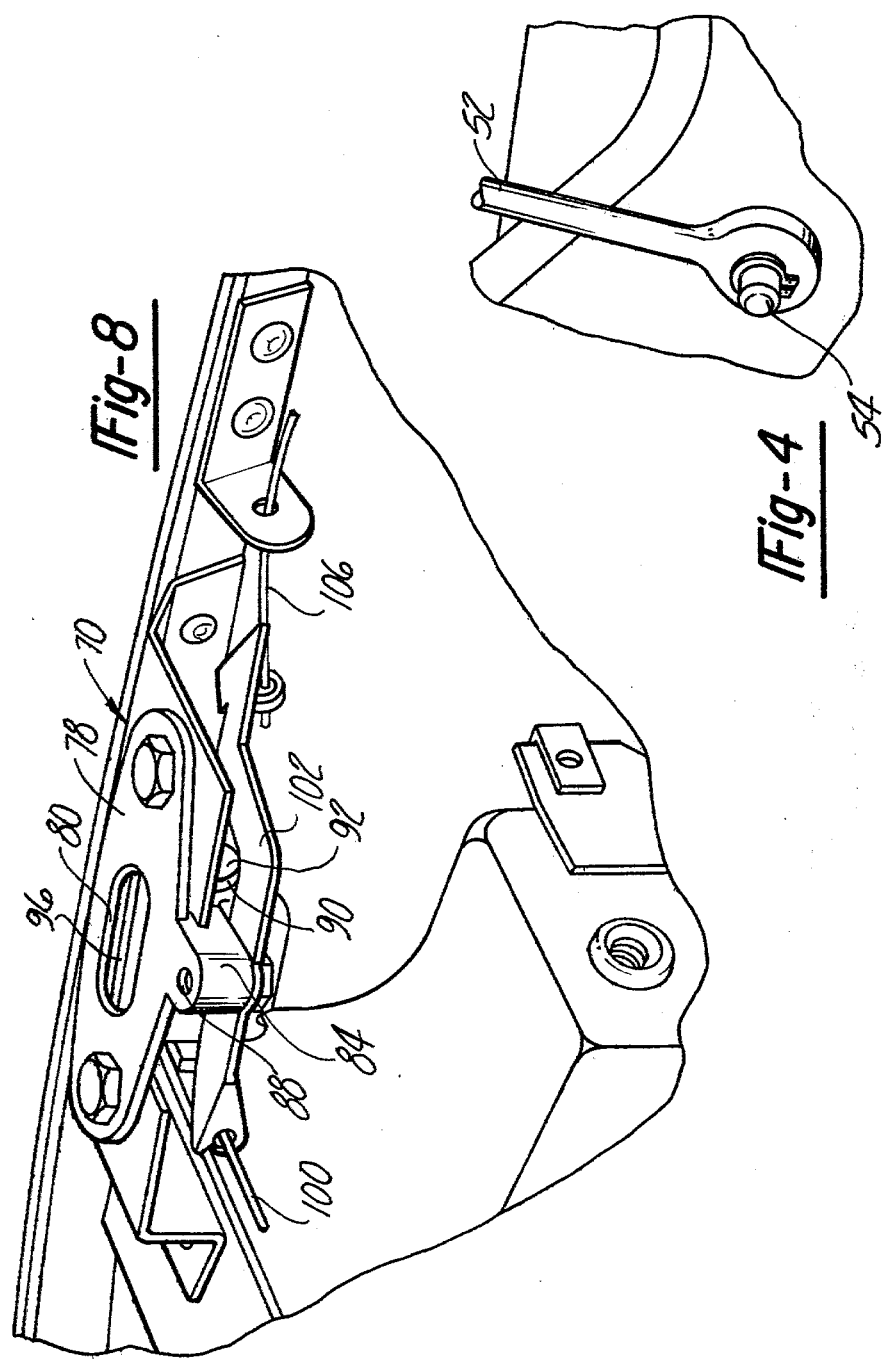

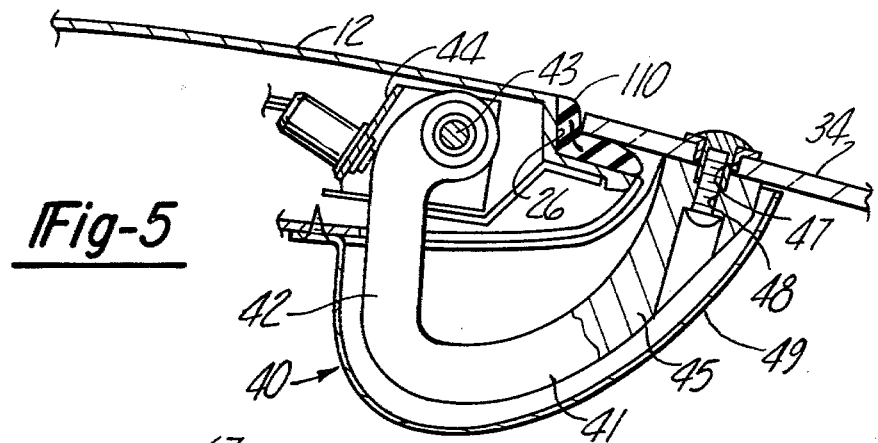
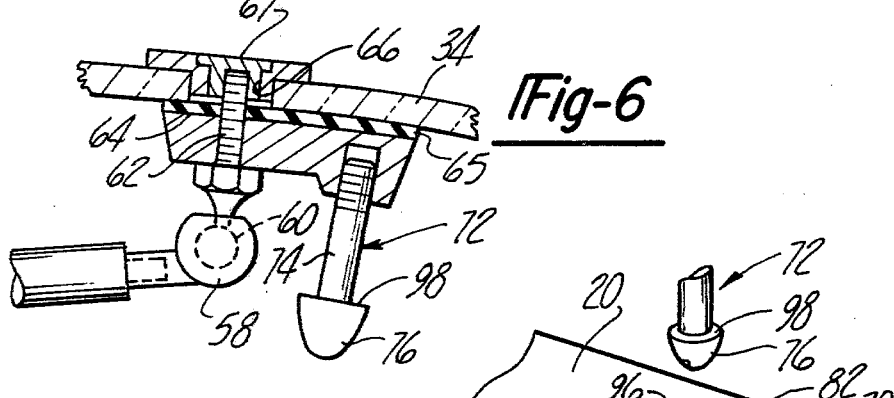
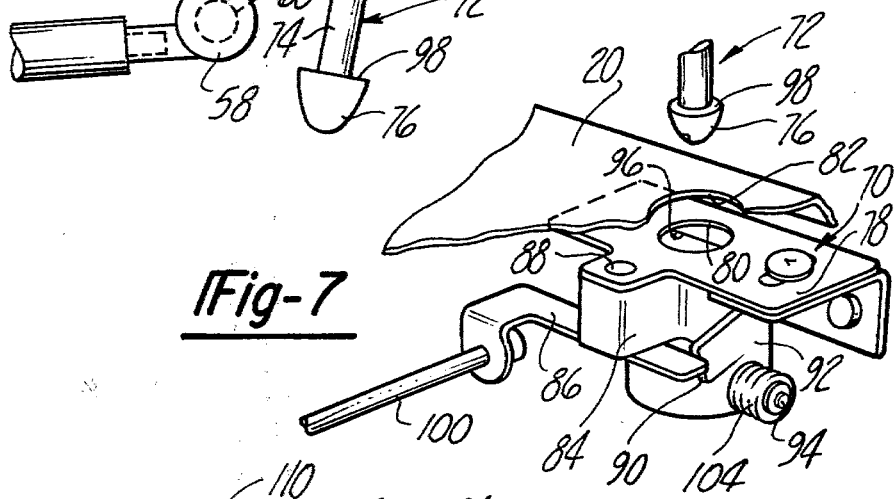
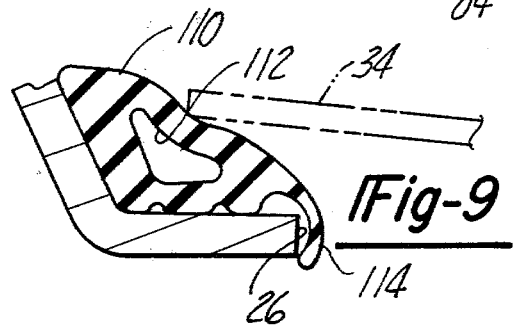

WINDOW STRUCTURE FOR VEHICLES

This invention relates to vehicle body structures and more particularly to vehicle bodies with an openable rear window.

Many sports cars with rigid or hard tops have very little storage space in the passenger compartment or have very limited access to any space that may be available in the passenger compartment. Larger pieces of luggage, golf clubs and the like must be loaded very carefully with a great deal of effort or must be attached to luggage racks and the like on the exterior of the vehicle.

It is an object of the invention to provide cargo access to the interior of a vehicle body by way of the rear window.

It is an object of the invention to modify a vehicle body having a permanent rear window by substituting an openable rear window.

It is an object of the invention to use the original light member forming the rear window to form an access panel to the interior of the vehicle.

Still a further object of the invention is to provide a vehicle body with an openable rear window which is normally biased toward an open position and is held in a closed position by a latch which is releasable from the driver's station.

The objects of the invention are accomplished by a vehicle body structure including a body member having a passenger compartment with a rear deck disposed rearwardly of the passenger compartment and a roof extending horizontally over the passenger compartment and forwardly of the rear deck. A window opening is formed having forward and rearward edges and generally L-shaped side edges having both vertical and horizontal portions. The opening is covered by a completely transparent and frameless panel which extends from the roof level rearwardly and downwardly to the rear deck. The rear glass panel is hinged to the body about a horizontal axis giving access to the passenger compartment. The panel is held in its open position by struts permitting the panel to be moved to selected opened positions and in the closed position the glass panel is held in firm engagement with a seal which acts to exclude air and moisture and at the same time tends to bias the panel towards a partially open position when the latch mechanisms holding the panel in a closed position are actuated to an unlocked position.

These and other objects of the invention are accomplished by the embodiment disclosed in the following description and illustrated in the drawings in which:

FIG. 1 is a side elevation of vehicle body embodying the present invention;

FIG. 2 is a view similar to FIG. 1 showing the invention under another condition of operation;

FIG. 3 is a perspective view on a larger scale as viewed from the upper left side of the vehicle and showing only portions of the rear window area of the vehicle;

FIG. 4 is a view of a portion of the structure seen in FIG. 3 but with portions broken away and removed for the purpose of disclosure;

FIG. 5 is a cross-sectional view at an enlarged scale of the hinged structure associated with the rear window of the vehicle body.

FIG. 6 is a cross-sectional view, also at an enlarged scale taken generally on line 6 in FIG. 3;

FIG. 7 is a perspective view at an enlarged scale of one of the latches that are seen also in FIG. 3 with parts broken away and removed for purposes of disclosure, looking forward and to the right of the vehicle body;

FIG. 8 is a perspective view similar to FIG. 7 of the latch assembly as the other side of the vehicle is viewed looking rearwardly and toward the left side of the vehicle; and FIG. 9 is a cross-sectional view as taken generally on line 9—9 in FIG. 3.

The invention is embodied in a vehicle body 10 having a roof 12 extending generally horizontally over a passenger compartment 14. The compartment 14 is provided with seats 16 behind which storage space 18 is provided. Rearwardly of the storage space 18 is an interior rear deck or package tray 20 and an exterior deck 22.

The body 10 is provided with a rear window opening 24 having its upper forward edge formed by the rear edge 26 of the roof. The rear edge 28 of the opening 24 is formed between the package tray 20 and the exterior rear deck 22. Bottom edges 30 at opposite sides of the opening 24 extend horizontally from the rear edge 28 and merge with forward vertical edges 32 extending upwardly to the edge 26 at the rear of the roof 12. The window opening 24 is conventionally fitted with a permanent glass light 34 which as viewed in FIG. 2 extends rearwardly and downwardly from the rear edge 26 of the roof 12 to rear edge 28 between the interior and exterior deck portions 20 and 22. The top portion 36 of the glass panel or light 34 is generally curved at its opposite sides to merge with side portions 38 to occupy the corner of the opening formed by the horizontal side edges 30 and the forward vertical edges 32 of the window opening 24.

In the present embodiment of the invention, the glass light or panel member 34 is removed from the vehicle body and it or a substitute glass panel is provided with a pair of hinges 40 by which the panel 34 can be moved between opened and closed positions. As seen in FIG. 5, each of the hinges 40 have a generally U shaped member 41, one leg 42 of which is pivoted on a pin 43 held in position relative to the vehicle roof 12 by a bracket 44. The pins 43 of the pair of hinges 40 are disposed in transverse alignment to each other to provide a generally horizontal pivot axis for the panel 34. The other leg 45 of each of the hinges 40 are fastened directly to the glass panel 34 by means of screw fasteners 46 passing through aligned openings 47 and 48 in the glass panel 34 and in the leg 45 of the hinges 40. Each of the hinges 40 are covered by a separate housing 49 fastened to the interior underside of the roof structure 12. The housing 49 serve to protect the occupants and the contents of the vehicle from contact with the moving hinge arms 41.

The glass panel 34 can be moved to a selected open position and is maintained in that open position by a pair of identical extensible struts 50. Each strut 50 includes a cylinder 51 and a rod 52 which are biased apart with a sufficient force to overcome the hinged load of the panel 34 and maintain it in a selected open positions. Such struts 50 are conventional and a description of their details are not required for a full understanding of the invention.

Struts 50 are mounted on the interior of the vehicle body and as best seen in FIG. 4, the free end of the rod 52 of each strut 50 is connected to the body at pin 54 to pivot about a horizontal transverse axis.

The cylinder 51 has the end opposite to rod 52 provided with a socket element 58 which as seen in FIG. 6 receives a complementary ball 60 formed at the end of a threaded stud 62. The stud 62 passes through a mounting member 64, a resilient pad 65 and through an opening 66 formed in the glass light 34 to threadably receive a nut 67 at the exterior of the light 34 to hold the mounting member 64 securely in position. The ball and socket arrangement 60, 58 at the end of the cylinder 51 acts as a pivot for the associated strut 50 during opening and closing of the panel 34. The rod pivot 54 at the opposite end of each of the struts 50 is concealed by a cover member 68 as seen in FIG. 3 which is provided with a relatively narrow slot 69 to accommodate the diameter of the rod 52. Mounting of the rod 52 of the strut 50 to the body member 10 makes it possible to conceal the pivot mounting 54 more effectively than would be possible if the ends of the struts 50 were reversed so that the cylinder 51 would be adjacent to the body.

The glass panel 34 is held in the closed position relative to opening 24 by a pair of similar latch assemblies 70 disposed at opposite sides of the vehicle in position to receive a pair of complementary latch elements 72 supported at opposite sides of the glass panel 34.

As seen in FIG. 7, the latch element 72 at each side of the panel 34 is in the form of a stud 74 threaded into the mounting member 64 and formed with a semi-eliptical head 76 to be received by the latch assemblies 70.

Referring to FIG. 7, the latch assembly 70 at the right side of the vehicle is shown to include a support plate 78 having an opening 80 in alignment with an opening 82 in the package tray 20. A mounting member 84 is supported from the plate 78 to pivotly support an actuating arm 86 movable about a vertical pivot pin 88 for engagement with a cam surface 90 on a lock member 92. Lock member 92 is pivoted relative to the mounting member 84 on a horizontally extending pin 94. The lock member 92 has a clamp portion 96 which is adapted to engage the underside surface 98 on the head 76 of the latch element 72.

The clamp portion 96 is engaged with the latch head 76 when the panel 34 is closed. The latch element 72 can be released by exerting a force to the left on the transverse rod 100 as viewed in FIG. 7 so that the actuating arm 86 pivots to swing the lock member 92 about its pivot 94 causing the clamp portion 96 to move outboard of the vehicle and out of engagement with the head 76.

The latch assembly 70 at the left side of the vehicle seen in FIG. 8 is substantially the same as the right latch assembly described above except that an actuating arm 102 is substituted for actuating arm 86. The actuating arm 102 engages a cam surface 90 to pivot the lock member 92 and at the same time to move the transverse rod 100 to simultaneously pivot the lock member 92 associated with the latch assembly 70 at the right side of the vehicle. In the closed position of the latch assemblies 70, the lock members 92 are biased inboard of the vehicle to a locked position by way of torsion springs 104 acting between the pivot pins 94 and the lock members 92.

The actuating arm 102 is pivoted about its vertical axis be means of a cable 106 connected to one end of the actuating arm 102 and extending forwardly in the passenger compartment to a position adjacent to drivers seat as seen in FIG. 3. The end of the release cable 106 is provided with a handle 108 so that when the cable 106 is pulled, the latch assemblies 70 are simultaneously released.

In its closed position, the glass panel 34 rests on a continuous seal 110 which is fitted around the entire perimeter of the opening 24. As best seen in FIG. 9, the cross section of the seal 110 forms an irregularly shaped body member having a hollow core indicated at 112. The seal 110 also has a lip portion 114 that extends into the window opening 24 and conceals the edges of the opening which in this case is the upper forward edge 26 of the opening 24. In the close position of the panel 34, the seal 110 is deformed and in certain locations the hollow core 112 may actually be completely closed by the panel 34 as seen, for example, in FIG. 5. The seal 110 acts to prevent the entry of air or moisture into the body compartment 14 and is maintained in tight sealing engagement by the latch mechanisms which include the latch assemblies 70 and the complementary latch elements 72. The seal 110 also forms a resilient means which continuously biases the panel 34 from its closed position as seen in FIG. 2 toward a partially open position after the latch assemblies 72 are first released from the interior of the vehicle. This permits the edge of the panel 34 to be grasped from the exterior of the vehicle so that it can be moved to a more fully open position as illustrated in FIGS. 1 and 3.

To convert the vehicle body 10 such as the one described, the permanent glass light is removed from the body and the perimeter of the resultant opening 24 is provided with a new seal 110. The glass light which has been removed, or a panel identical to the one that has been removed, is formed with openings 47 and 66. The openings are used to attach a pair of hinges 40 and mounting members 64. The body member 10 also is fitted with supports for the hinge pin 43 and the strut pin 54. Latch assemblies 70 are installed at opposite sides of the vehicle and under the package tray 20 and are interconnected by the transverse rod 100 and fitted with a release cable 106. The entire perimeter of the opening 24 is provided with a seal 110 after which the panel 34 may be placed in position to complete attachment of the hinges 40 and the struts 50.

In the closed position of the panel 34 as seen in FIG. 2, the struts 50 are disposed substantially horizontally and parallel to the bottom edge 30 at opposite sides of the panel 34. This serves to substantially concealed the struts 50 from view when the panel 34 is in its closed position.

Upon actuation of the latch assemblies 72 to their released condition by pulling the release cable 106 by way of handle 108 in the vehicle interior, the seal 110 acts to bias the panel 34 to a partially open position. Thereafter the edge of panel 34 can be grasped by the fingers from the exterior of the vehicle and moved to a selected open position. In such selected position the struts 50 act to counterbalance the panel 34 and maintain it in an open position to give access for loading cargo to the storage space 18 and rear deck 20 through the window opening 24.

A vehicle body structure and the method of modifying a body structure has been provided wherein the normally permanent rear window is modified by removing the permanent light and inserting a frameless light or panel with hinges by which the panel can be moved between open and closed positions. A pair of struts are attached between the body and panel by which the panel may be maintained in a selected open position. Latch elements also are provided which are received by complementary latch assemblies mounted on the body member. The struts are so arranged that they are substantially concealed when the panel is in its closed position and the rod end of the strut is pivoted to the body in a manner which serves to conceal the pivot. The body is provided with a seal which forms the resilient means by which the panel is biased towards its open position and also serves to exclude the entry of air and moisture. The panel is put in condition for opening by actuation of a release cable accessable only from the interior of the vehicle body which also aids to prevent unauthorized access.

The embodiments of the invention in which an exclusive property or privilege is claimed are defined as follows:

1. A vehicle body structure comprising; a body member forming a passenger compartment, a rear deck disposed rearwardly of said passenger compartment, a roof extending horizontally over said passenger compartment and disposed forwardly of said rear deck, a window opening having an upper forward edge at the rear of said roof, a lower rear edge on said deck, horizontal side edges extending forwardly from opposite ends of said rear edge and merging with the lower ends of a pair of forward vertical edges, the upper ends of said forward vertical edges merging with opposite ends of said upper forward edge, a completely transparent and frameless panel covering said opening, hinge means connecting said panel to said roof to permit swinging movement of said panel about a horizontal axis between a closed position and an open position giving cargo loading access to said passenger compartment through said window opening, a pair of mounting structures mounted on said panel adjacent said side edges, biasing means including a pair of extensible struts each having one end pivoted to said body and the other end pivoted to said mounting structure and continuously biasing said panel toward an open position, latch means including a pair of latch elements formed by said pair of mounting structures and being operative to hold said panel in a closed position relative to said body member, and latch release means disposed in said passenger compartment adjacent the driver station and in spaced relationship to said latch means for simultaneously releasing said latch elements to permit movement of said panel toward said open position under the action of said biasing means.

2. The combination of claim 1 wherein said pair of struts are disposed in substantially horizontal positions to conceal said struts when said panel member is in a closed position.

3. The combination of claim 1 wherein the edges forming the window opening are provided with a continuous seal for engaging the marginal edges of said panel member when the latter is in its closed position.

4. The combination of claim 1 wherein said means continuously biasing said panel also includes a seal supported on the perimeter of said window opening and is engagable with the underside of said panel to urge the latter toward an open position upon actuation of said latch release means.

5. The combination of claim 1 wherein said struts each include a cylinder and a piston rod extending therefrom, said cylinders being pivotally connected to said mounting structures, a pair of pivot mountings disposed at opposite sides of said body, said rods being pivotally connected to said pivot mountings, and a pair of cover members each covering and concealing the ends of said rods and associated pivot mountings.

* * * * *